(12) United States Patent
Krausz et al.

(10) Patent No.: US 8,870,189 B2
(45) Date of Patent: Oct. 28, 2014

(54) ADJUSTABLE SEAL

(75) Inventors: Eliezer Krausz, Tel-Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 1323 days.

(21) Appl. No.: 12/294,452

(22) PCT Filed: Mar. 13, 2007

(86) PCT No.: PCT/IL2007/000324
§ 371 (c)(1),
(2), (4) Date: Nov. 9, 2009

(87) PCT Pub. No.: WO2007/110856
PCT Pub. Date: Oct. 4, 2007

(65) Prior Publication Data
US 2010/0230906 A1    Sep. 16, 2010

(30) Foreign Application Priority Data
Mar. 29, 2006 (IL) .......................................... 174621

(51) Int. Cl.
F16L 21/02 (2006.01)
F16L 21/06 (2006.01)
F16L 17/04 (2006.01)
F16L 17/03 (2006.01)
F16L 21/00 (2006.01)

(52) U.S. Cl.
CPC .............. F16L 17/032 (2013.01); F16L 17/04 (2013.01); F16L 21/005 (2013.01); Y10S 277/917 (2013.01)
USPC ......................................... 277/609; 277/917

(58) Field of Classification Search
USPC ......... 277/602, 607, 608, 609, 644, 650, 906, 277/917, 604, 606, 641; 285/104, 373, 285/110–112
See application file for complete search history.

(56) References Cited

U.S. PATENT DOCUMENTS

| | | | | |
|---|---|---|---|---|
| 3,425,889 A | * | 2/1969 | Willits, Jr. ................ | 248/220.43 |
| 3,476,410 A | * | 11/1969 | Pastva, Jr. .................... | 285/112 |
| 3,925,943 A | * | 12/1975 | Petrie ............................ | 135/125 |
| 3,958,385 A | * | 5/1976 | Bondra et al. .............. | 52/404.1 |
| 4,056,273 A | | 11/1977 | Cassel | |
| 4,101,151 A | | 7/1978 | Ferguson | |

(Continued)

OTHER PUBLICATIONS

Search Report from International Application No. PCT/IL07/00324 mailed on Nov. 25, 2008.

*Primary Examiner* — Vishal Patel
*Assistant Examiner* — Stacy Warren
(74) *Attorney, Agent, or Firm* — Dekel Patent Ltd.; David Klein

(57) ABSTRACT

The invention relates to external sealing of pipe joints. The invention provides a wide seal strip useful in combination with a coupling for pipes, the length, and hence the diameter of the seal strip being adjustable also on site. The invention provides a pipe clamp flexible seal strip adaptable to be easily shortened by the user to a required length. The seal strip being configured for use inside a pipe coupling, and having at least one narrow dividing cut which extends across the width of the seal to almost completely divide a major portion of the strip length from a minor portion thereof. The minor portion remaining connected to the major portion by at least one bridge member which can easily be severed on site for removal and disposal of the minor portion.

4 Claims, 3 Drawing Sheets

(56) References Cited

U.S. PATENT DOCUMENTS

| | | | | |
|---|---|---|---|---|
| 4,157,833 A | * | 6/1979 | Kozlowski | 277/511 |
| 4,200,299 A | * | 4/1980 | Carlesimo | 277/606 |
| 4,350,350 A | * | 9/1982 | Blakeley | 277/626 |
| 4,570,945 A | * | 2/1986 | Hayashi | 277/486 |
| 4,583,770 A | * | 4/1986 | Kreku et al. | 285/148.26 |
| 4,671,028 A | * | 6/1987 | Figone | 52/108 |
| 4,715,609 A | * | 12/1987 | Mino et al. | 277/608 |
| 5,023,128 A | * | 6/1991 | Fatool | 428/172 |
| 5,087,492 A | * | 2/1992 | Vallauri et al. | 428/34.9 |
| 5,199,724 A | * | 4/1993 | Meltsch et al. | 285/236 |
| 5,286,040 A | * | 2/1994 | Gavin | 277/606 |
| 5,507,500 A | | 4/1996 | Skinner et al. | |
| 5,711,536 A | * | 1/1998 | Meyers | 277/606 |
| 5,758,906 A | * | 6/1998 | Carlstrom et al. | 285/112 |
| 5,960,820 A | * | 10/1999 | Helmsderfer | 137/375 |
| 6,129,485 A | * | 10/2000 | Grabe et al. | 405/152 |
| 6,530,576 B1 | * | 3/2003 | Earl et al. | 277/615 |
| 6,575,475 B1 | * | 6/2003 | Duncan | 277/607 |
| 7,694,978 B2 | * | 4/2010 | Starr | 277/645 |
| 7,829,001 B2 | * | 11/2010 | Gladfelter | 264/171.15 |
| 2003/0047880 A1 | * | 3/2003 | Ross | 277/626 |
| 2004/0079431 A1 | * | 4/2004 | Kissell | 138/149 |
| 2006/0047880 A1 | * | 3/2006 | Lindblom et al. | 710/305 |

\* cited by examiner

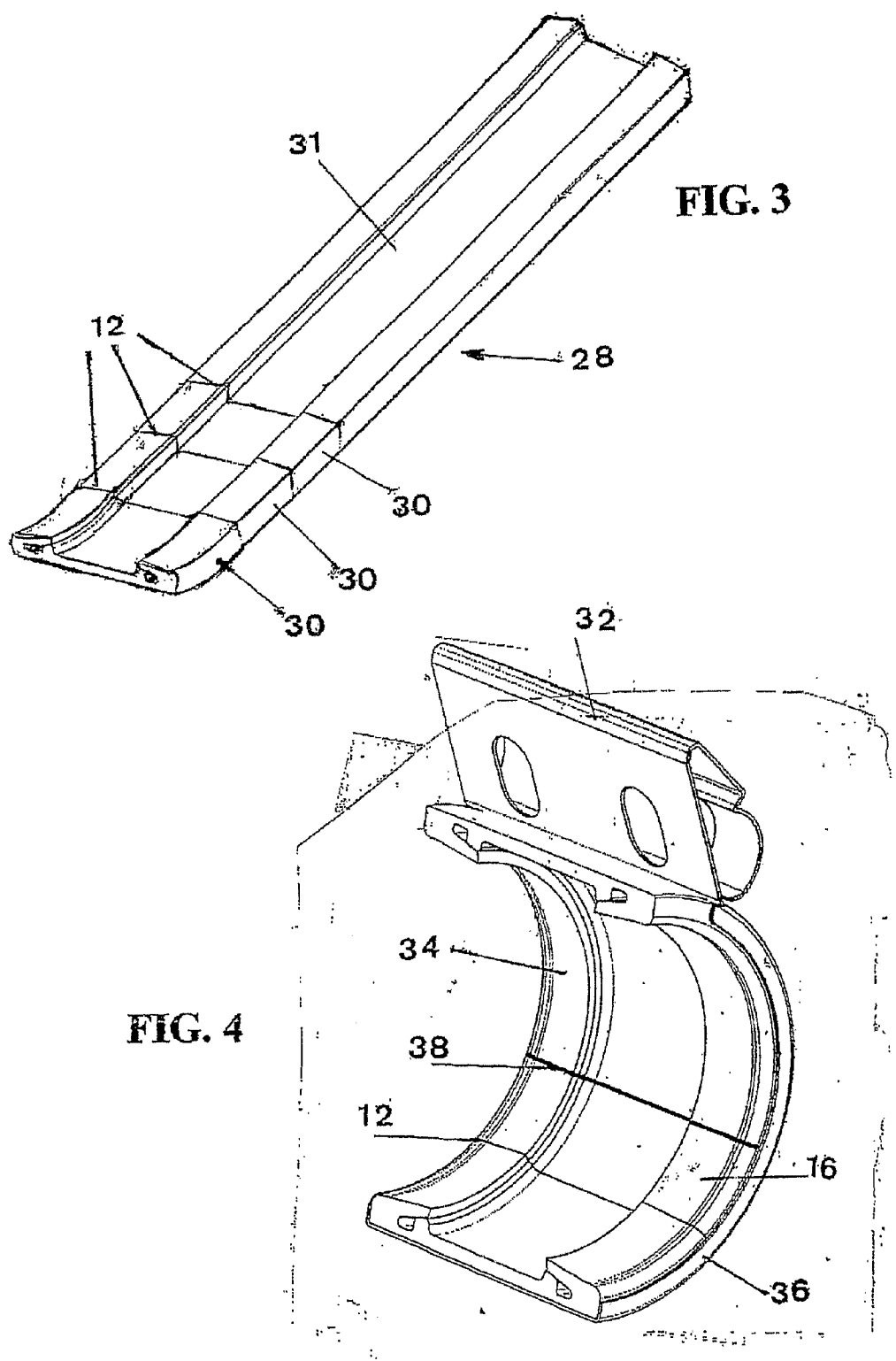

ADJUSTABLE SEAL

CROSS-REFERENCE TO RELATED APPLICATION

This application is a National Phase Application of PCT International Application No. PCT/IL2007/000324, International Filing Date 13 Mar. 2007, claiming priority of IL Patent Application No. 174621, filed 29 Mar. 2006.

FIELD AND BACKGROUND OF THE INVENTION

The present invention relates to external sealing of pipe joints.

More particularly, the invention provides a wide seal strip useful in combination with a coupling for pipes, the length, and hence the diameter of the seal strip being adjustable also on site.

Wide flexible seals having a sealing member proximate to each edge are known, and have been marketed by the present inventor and others for some years. The seal has two active lips, a first of which contacts a first pipe and the second lip contacts the second pipe. The seal is typically held inside a pipe coupling. The substantially-flat connecting portion of the seal prevents leakage from the space(s) between the pipes and between the active seal lips.

Such seals are made as a ring and fit into the respective coupling. Accordingly for each coupling a special seal is required, meaning that a large number of seals for each diameter is to be manufactured.

According to the invention a seal strip is provided to be cut to the required diameter.

When the precise outside diameter of the pipes to be connected and sealed is known, the seal strip can be accurately cut to length beforehand in a manner allowing the ends of the seal strip to match each other closely and thus prevent leakage there between. In the factory or at the supplier's workplace it is easy to execute the accurate cut required. However when the seal is cut to the required length on site by hand using scissors or a sharp knife, the two ends of the seal will not match well, leading to possible leakage there between. Furthermore, there is also a danger of personal injury when such cutting is carried out on site.

A search of US Patents produced no relevant disclosures relating to this problem.

OBJECTS OF THE INVENTION

It is therefore one of the objects of the present invention to obviate the disadvantages of prior art seals and to provide a seal strip which can be shortened by the user accurately and easily at the site of use.

SUMMARY OF THE INVENTION

The present invention achieves the above objects by providing a pipe clamp flexible seal strip adaptable to be easily shortened by the user to a required length, said seal strip being configured for use inside a pipe coupling, and having at least one narrow dividing cut which extends across the width of the seal to almost completely divide a major portion of the strip length from a minor portion thereof, said minor portion remaining connected to said major portion by at least one bridge member which can easily be severed on site for removal and disposal of said minor portion.

In a preferred embodiment of the present invention there is provided a seal strip, wherein two minor portions are connected to said major portion.

In a further preferred embodiment of the present invention there is provided a seal strip wherein at least two minor portions are connected in series.

In a most preferred embodiment of the present invention there is provided a band-type pipe coupling in combination with a seal strip as described.

It will thus be realized that the novel seal of the present invention serves to allow quick removal of an unwanted segment to achieve a desired seal strip length wherein the two ends meet accurately and thus will not be a cause of leakage.

The small bridges connecting the short segments to the major portion of the seal can be severed using a knife, scissors or by bending if the elastomer is hard. The cut-off minor portion is discarded.

As more than one minor portion for easy removal may be provided, the lengths of the minor portions are preferably unequal, thus giving the user the several options of shortening the strip by a larger or lesser amount.

SHORT DESCRIPTION OF THE PREFERRED EMBODIMENTS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 3 is a perspective view of a seal strip according to the invention;

FIG. 4 is a perspective half view of a band-type coupling fitted with a seal strip according to the invention.

FULL DISCLOSURE OF THE INVENTION

Figure 1:
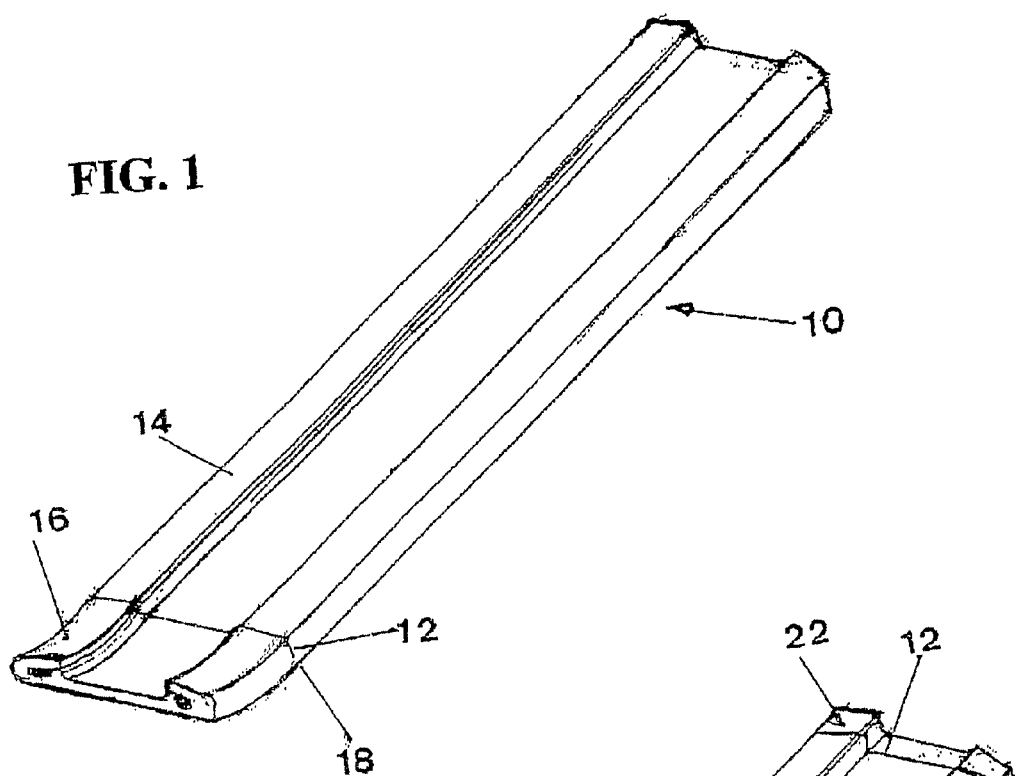
FIG. 1 is a perspective view of a preferred embodiment of the seal strip according to the invention.

There is seen in FIG. 1 a pipe clamp flexible seal strip 10 adaptable to be easily shortened by the user to a required length.

Figure 5:
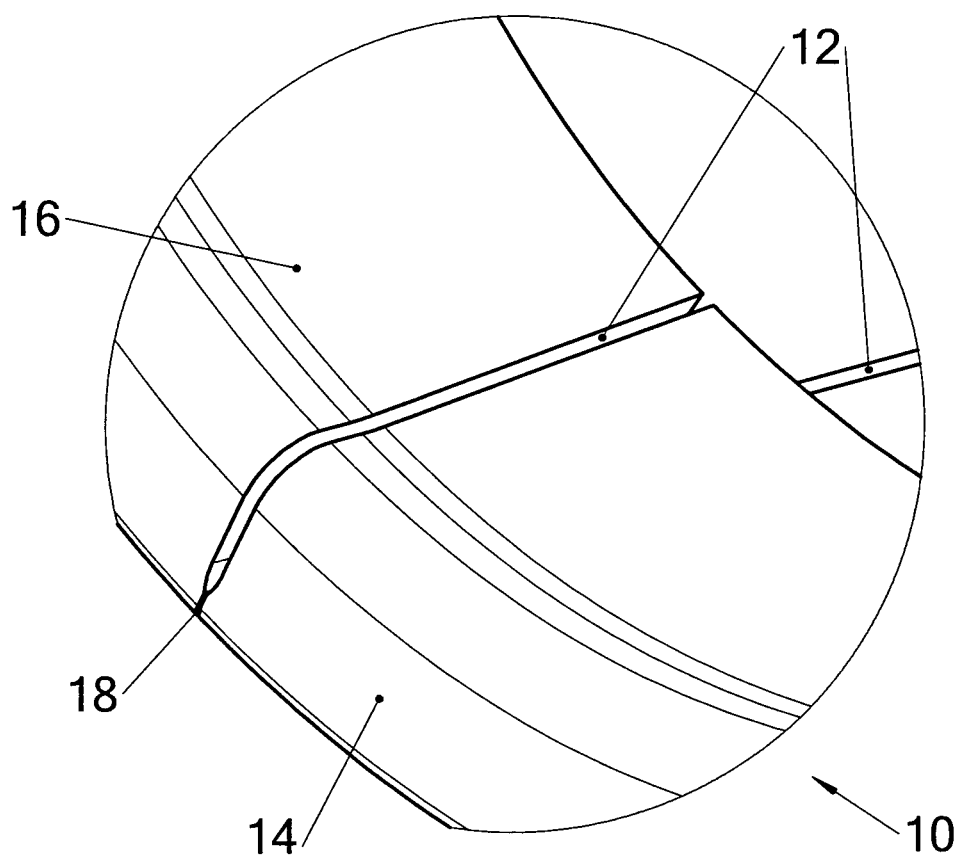
FIG. 5 is an enlarged perspective view of a dividing cut between a major and a minor portion of the seal strip.

The seal strip 10 is configured for use inside a band-type pipe coupling 32, seen in FIG. 4, and has a narrow dividing cut 12, seen in enlarged detail in FIG. 5, which extends across the width of the seal 10 to almost completely divide a major portion 14 of the strip length from a minor portion 16 thereof.

The minor portion 16 however remains connected to the major portion 14 by a bridge member or retaining bridge 18 which can easily be severed on site for removal and disposal of the minor portion 16.

With reference to the rest of the figures, similar reference numerals have been used to identify similar parts.

Figure 2:
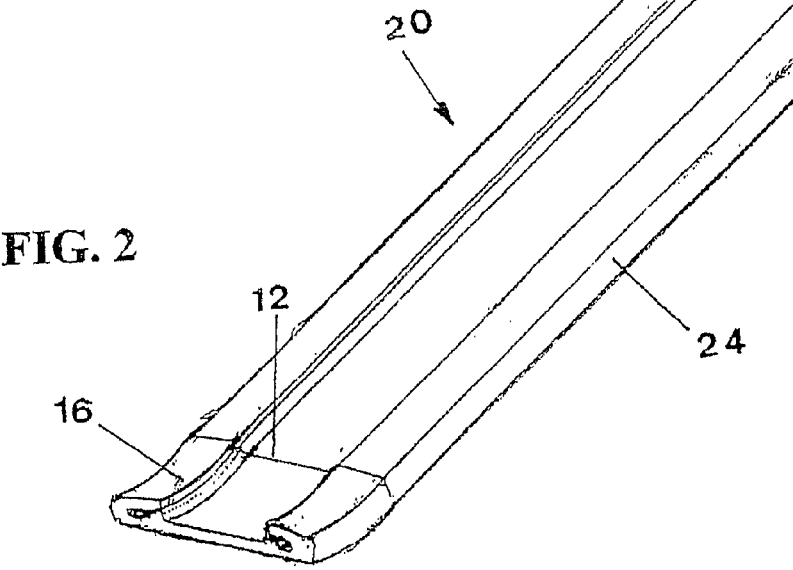
FIG. 2 is a perspective view of a second embodiment.

Referring now to FIG. 2, there is seen a seal strip 20 wherein two minor portions 16, 22 are connected to the major portion 24, one minor portion being attached at each end of the major portion 24 at each end thereof.

The two minor portions 16, 22 are of unequal length. A simple numerical example is given to illustrate this concept. Suppose the seal strip is 50 cm long total, a first minor portion is 3 cm long, and a second minor portion is 7 cm long.
The strip can thus be used as is, 50 cm long.
Breaking off the smaller piece leaves the seal strip 47 cm long.
If the larger piece is broken off, the seal strip is 43 cm long.
Breaking off both pieces leaves the seal strip 40 cm long.

FIG. 3 illustrates a seal strip 28 wherein three minor portions 30 are connected in series. As many minor portions 30 as necessary can be cut off to enable the major portion 31 of the seal strip still connected to the remaining minor portions 30 to encircle pipes (not shown) of the outer diameter being interconnected.

Seen in FIG. 4 is a band-type pipe coupling 32 in combination with a seal strip 34. The seal strip is housed in a low-wall channel 36. The joint 38 between the two extremities of the seal 34 is seen proximate to a dividing cut 12 which has not been utilized in the present example.

Turning now to FIG. 5, there is depicted a detail of the dividing cut 12 between the major portion 14 and the minor portion 16. The cut 12 extends down to about 90% of the depth of the elastomer material, leaving the retaining bridge 18 at the lower side of the seal strip 10. The retaining bridge 18 can easily be cut by a knife or scissors if the minor portion 16 is to be removed to shorten the seal strip 10.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

The invention claimed is:

1. An article comprising:
a pipe clamp flexible seal strip comprising an elongate axial portion, called a major portion, which has a full length and a width shorter than the full length, and which has two opposite ends distanced from one another by the full length of said elongate axial portion, said elongate axial portion being curved and extending peripherally about a central longitudinal axis, corresponding to a central longitudinal axis of a pipe to be sealed by said seal strip;
two minor portions, each minor portion connected to one of said ends of said major portion by a severable bridge member so as to form a combined seal with a length equal to said length of said elongate axial portion plus a length of each said minor portion, wherein said two minor portions are of unequal length; and
a dividing cut that extends across a width of said seal strip to almost completely divide said major portion from each said minor portion, said width being parallel to the central longitudinal axis, and wherein the length of the combined seal becomes shorter upon severing each said minor portion from said major portion.

2. The article according to claim 1, comprising a third minor portion connected to an end of one of said minor portions comprising a first end connected to one of said ends of said major portion, and a second minor portion connected to a second end of said first minor portion opposite to said first end.

3. The article according to claim 2, comprising a fourth minor portion connected to said third minor portion.

4. The article according to claim 1, wherein said dividing cut extends down to about 90% of a depth of said seal strip.

* * * * *